US010574988B2

(12) United States Patent
Thirumalai et al.

(10) Patent No.: US 10,574,988 B2
(45) Date of Patent: Feb. 25, 2020

(54) SYSTEM AND METHODS FOR REDUCING SLICE BOUNDARY VISUAL ARTIFACTS IN DISPLAY STREAM COMPRESSION (DSC)

(71) Applicant: QUALCOMM Incorporated, San Diego, CA (US)

(72) Inventors: Vijayaraghavan Thirumalai, San Diego, CA (US); Natan Haim Jacobson, San Diego, CA (US); Rajan Laxman Joshi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 79 days.

(21) Appl. No.: 15/353,669

(22) Filed: Nov. 16, 2016

(65) Prior Publication Data
US 2017/0150150 A1   May 25, 2017

Related U.S. Application Data

(60) Provisional application No. 62/257,561, filed on Nov. 19, 2015.

(51) Int. Cl.
*H04N 19/124* (2014.01)
*H04N 19/91* (2014.01)
(Continued)

(52) U.S. Cl.
CPC ........... *H04N 19/124* (2014.11); *H04N 19/14* (2014.11); *H04N 19/15* (2014.11); *H04N 19/176* (2014.11);
(Continued)

(58) Field of Classification Search
CPC .... H04N 19/14; H04N 19/115; H04N 19/124; H04N 19/176
See application file for complete search history.

(56) References Cited

U.S. PATENT DOCUMENTS 7,671,893 B2 * 3/2010 Li ............... H04N 7/17318
    348/143
8,582,656 B2 * 11/2013 Lin ............... H04N 19/176
    375/240.18
(Continued)

FOREIGN PATENT DOCUMENTS

EP    2348734 A1    7/2011

OTHER PUBLICATIONS

VESA Display Stream Compression; Wall; MacInnis; 2014.*
(Continued)

*Primary Examiner* — Luis Perez-Fuentes
(74) *Attorney, Agent, or Firm* — Shumaker & Sieffert, P.A.

(57) ABSTRACT

Provided are systems and methods for adjusting quantization parameters of blocks of video data to be encoded, in order to reduce visual artifacts between slices of video data. Each slice includes one or more blocks organized in one or more lines, and can be coded independently without information from any other slices of video data. A complexity value of a current block corresponding to a last block of the slice on a particular line is determined and used to determine whether the current block includes a transition from a complex region to a flat region, wherein complex regions are characterized as having higher complexity in comparison to flat regions. In response to a determination that the current block includes such a transition, the QP for coding the current block may be decreased.

8 Claims, 11 Drawing Sheets

(51) Int. Cl.
*H04N 19/15* (2014.01)
*H04N 19/176* (2014.01)
*H04N 19/14* (2014.01)
*H04N 19/174* (2014.01)
*H04N 19/184* (2014.01)

(52) U.S. Cl.
CPC .......... *H04N 19/91* (2014.11); *H04N 19/174* (2014.11); *H04N 19/184* (2014.11)

(56) References Cited

U.S. PATENT DOCUMENTS

| | | | | |
|---|---|---|---|---|
| 8,594,186 | B1* | 11/2013 | Denolf ................ | H04N 19/105 375/240.02 |
| 8,619,874 | B2* | 12/2013 | Lin ...................... | H04N 19/13 375/240.18 |
| 9,210,435 | B2* | 12/2015 | Takahashi ........... | H04N 19/176 |
| 9,930,346 | B2* | 3/2018 | Thirumalai .......... | H04N 19/115 |
| 2007/0071094 | A1* | 3/2007 | Takeda ................ | H04N 19/197 375/240.04 |
| 2008/0152244 | A1* | 6/2008 | Suino .................. | G06T 5/002 375/240.03 |
| 2014/0092960 | A1* | 4/2014 | MacInnis ............ | H04N 19/149 375/240.03 |
| 2014/0098857 | A1 | 4/2014 | MacInnis et al. | |
| 2015/0296206 | A1 | 10/2015 | Thirumalai et al. | |
| 2015/0296209 | A1* | 10/2015 | Thirumalai .......... | H04N 19/115 375/240.18 |
| 2015/0304675 | A1* | 10/2015 | Jacobson ............ | H04N 19/593 375/240.12 |
| 2016/0044308 | A1* | 2/2016 | Jacobson ............ | H04N 19/105 375/240.02 |
| 2017/0092226 | A1* | 3/2017 | Park .................... | G09G 5/006 |
| 2017/0150150 | A1* | 5/2017 | Thirumalai .......... | H04N 19/14 |

OTHER PUBLICATIONS

Guest Editorial Screen Content Video Coding and Applications; Dec. 2016.*
VESA Display Stream Compression for Television and Cinema Applications; Wall; MacInnis; Dec. 2016.*
Quality and Error Robustness Assessment of Low-Latency Lightweight Intra-Frame Codecs for Screen COntent Compression by Willeme; 2016.*
VESA Display Stream Compression; Walls; MacInnis; 2014. (Year: 2014).*
Guest Editorial Screen Content Video Coding and Applications; Dec. 2016. (Year: 2016).*
VESA Display Stream Compression for Television and Cinema Applications; Walls; 2016. (Year: 2016).*
Overview of the High Efficiency Video Coding (HEVC) Standard; Sullivan; 2012. (Year: 2012).*
VESA Display Stream Compression; Wall; MacInnis; 2014. (Year: 2014).*
International Search Report and Written Opinion—PCT/US2016/062460—ISA/EPO—dated Mar. 14, 2017.
Walls F. et al., "VESA Display Stream Compression", March, Mar. 3, 2014 (Mar. 3, 2014), XP055231850, Retrieved from the Internet : URL :http:/www.vesa.orgjwp-contentjuploads/2014/04/VESA DSC-ETP200.pdf; pp. 1-5.

* cited by examiner

SYSTEM AND METHODS FOR REDUCING SLICE BOUNDARY VISUAL ARTIFACTS IN DISPLAY STREAM COMPRESSION (DSC)

INCORPORATION BY REFERENCE TO PRIORITY APPLICATION(S)

This application claims the benefit of U.S. Provisional Application No. 62/257,561, filed Nov. 19, 2015, which is hereby incorporated by reference under 37 CFR 1.57.

TECHNICAL FIELD

This disclosure relates to the field of video coding and compression, and particularly to video compression for transmission over display links, such as display stream compression (DSC).

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, an apparatus for encoding video data is provided. The apparatus can include a memory for storing the video data. The apparatus can also include a hardware processor operationally coupled to the memory. The processor may be configured to receive the video data to be coded using multiple slices, each slice including one or more blocks organized in one or more lines, wherein a line can include blocks for multiple slices. The process may be further configured to determine whether at least some of a current block and neighboring blocks of the current block include a transition from a complex region to a flat region. The processor may also be configured to adjust a quantization parameter (QP) for coding the current block based on the determination.

In another aspect, an apparatus for decoding video data is provided. The apparatus can include a memory for storing the video data. The apparatus can also include a hardware processor operationally coupled to the memory. The processor may be configured to receive the video data to be coded, the video data including information associated with multiple slices, each slice including one or more blocks organized in one or more lines, wherein a line can include blocks for multiple slices. The processor may also be configured to receive an indicator of whether to adjust a quantization parameter (QP) for coding the current block, wherein a value of the indicator is based on a determination of whether at least some of a current block and neighboring blocks of the current block include a transition from a complex region to a flat region. The processor may be further configured to adjust the QP for coding the current block based at least in part on the value of the indicator.

In another aspect, an apparatus for encoding video data is provided. The apparatus can include a memory for storing the video data. The apparatus can also include a hardware processor comprising an integrated circuit, the hardware processor being operationally coupled to the memory. The processor may be configured to receive a slice of video data to be coded corresponding to a spatially distinct region in a frame of the video data, the slice including one or more blocks organized in one or more lines, and wherein the slice can be coded independently without information from any other slices of video data. The processor may be further configured to determine a complexity value of a current block corresponding to a last block of the slice on a particular line. The processor may be further configured to determine whether the current block includes a first transition from a complex region to a flat region based at least in part upon the determined complexity value of the current block, wherein complex regions are characterized as having higher complexity in comparison to flat regions. The processor may be further configured to, in response to a determination that the current block includes the first transition, decrease a quantization parameter (QP) for coding the current block.

In another aspect, a computer-implemented method for encoding video data is provided. The method comprises receiving a slice of video data to be coded corresponding to a spatially distinct region in a frame of the video data, the slice including one or more blocks organized in one or more lines, and wherein the slice can be coded independently without information from any other slices of video data. The method further comprises determining a complexity value of a current block corresponding to a last block of the slice on a particular line. The method further comprises determining whether the current block includes a first transition from a complex region to a flat region based at least in part upon the determined complexity value of the current block, wherein complex regions are characterized as having higher complexity in comparison to flat regions. The method further comprises, in response to a determination that the current block includes the first transition, decreasing a quantization parameter (QP) for coding the current block.

In another aspect, an apparatus for decoding video data is provided. The apparatus can include a memory for storing the video data. The apparatus can also include a hardware processor operationally coupled to the memory. The processor may be configured to receive a slice of video data to be coded corresponding to a spatially distinct region in a frame of the video data, the slice including one or more blocks organized in one or more lines, and wherein the slice can be coded independently without information from any other slices of video data. The processor may be further configured to for a current block corresponding to a last block of the slice on a particular line, receive an indicator of whether to adjust a quantization parameter (QP) for coding the current block, wherein a value of the indicator is based on a determination of whether the current block includes a transition from a complex region to a flat region. The processor may be further configured to adjust the QP for coding the current block based at least in part on the value of the indicator.

DETAILED DESCRIPTION

Figure 1A:
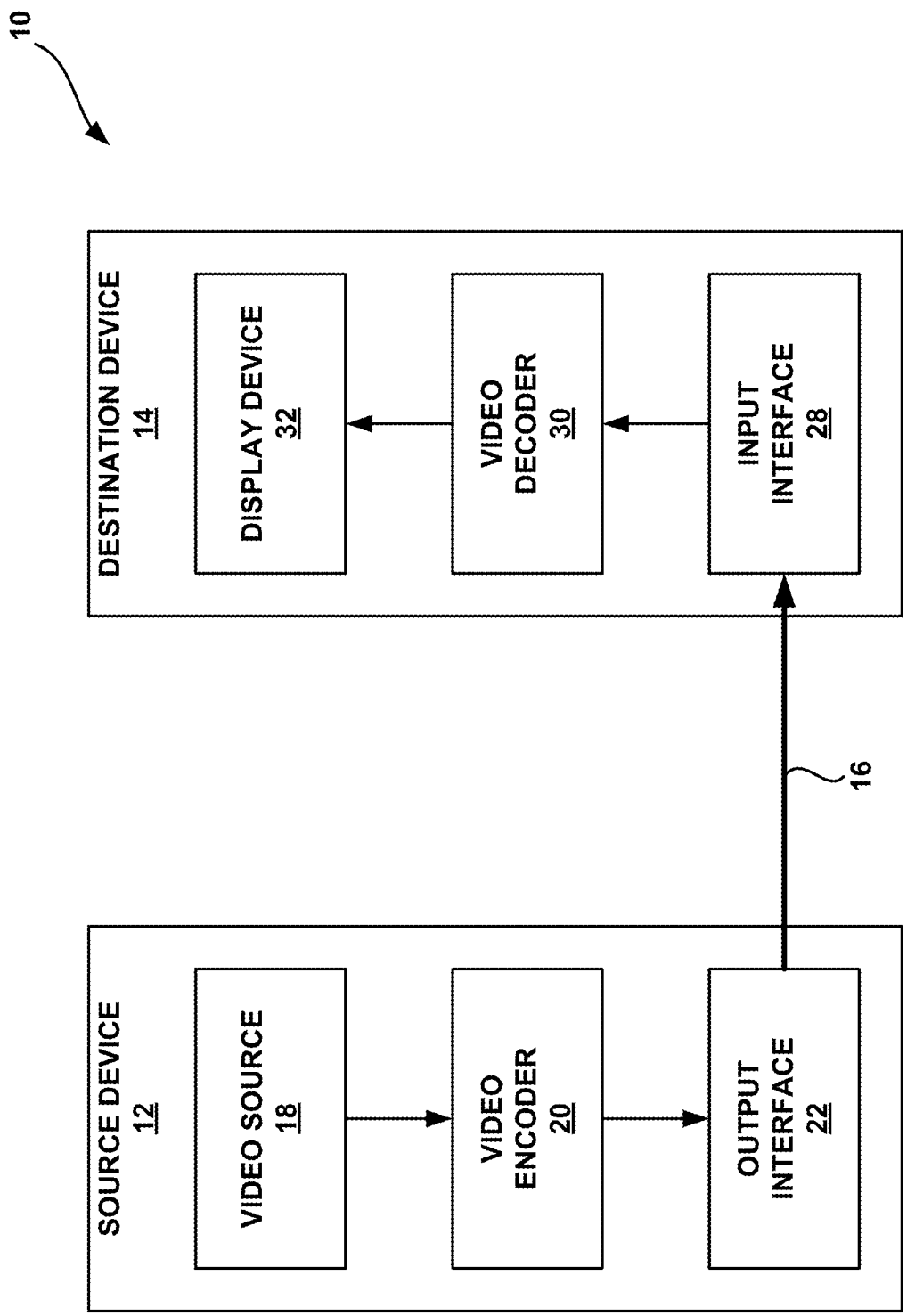
FIG. 1A is a block diagram illustrating an example video encoding and decoding system that may utilize techniques in accordance with aspects described in this disclosure.

In general, this disclosure relates to methods of improving video compression techniques such as display stream compression (DSC). More specifically, the present disclosure relates to systems and methods for processing visual artifacts across slice boundaries.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. Also, the techniques described in this disclosure may become part of standards developed in the future. In other words, the techniques described in this disclosure may be applicable to previously developed video coding standards, video coding standards currently under development, and forthcoming video coding standards.

Advanced DSC can be configured to use multiple slices in a line. For example, the parameter N is greater than 1 (i.e., N>1). However, when the Advanced DSC is configured to use multiple slices in a line, noticeable visual artifacts can appear at the vertical slice boundaries.

In order to address these and other challenges, the techniques of the present disclosure can address the visual artifact across the slice boundary when Advanced DSC is configured to use multiple slices in a line. For example, the QP value can be adjusted based on whether a transition from a complex/busy region to a flat/smooth region exists between one or more blocks or within a block. The techniques can check for various types of transitions. For example, the techniques may determine whether a transition exists between the last block in the previous line and the first block in the current line within the same slice, or within the last block in each line in the current slice, or between the current block and spatially neighboring blocks in the same slice or the next slice in the same line, etc. Complexity values may be determined for one or more blocks in order to determine whether such a transition exists. The QP value of the current block or other blocks can be adjusted based on the determination that a transition exists. For example, the QP value can be decreased when a transition exists. Detecting transitions and adjusting the QP value can reduce the appearance of visual artifacts across slice boundaries.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques. Advanced DSC is being developed, for example, in order to provide compression ratios of 4:1 or higher. Compression ratios of 4:1 or higher may be used for mobile devices, e.g., for high resolution displays such as 4K.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
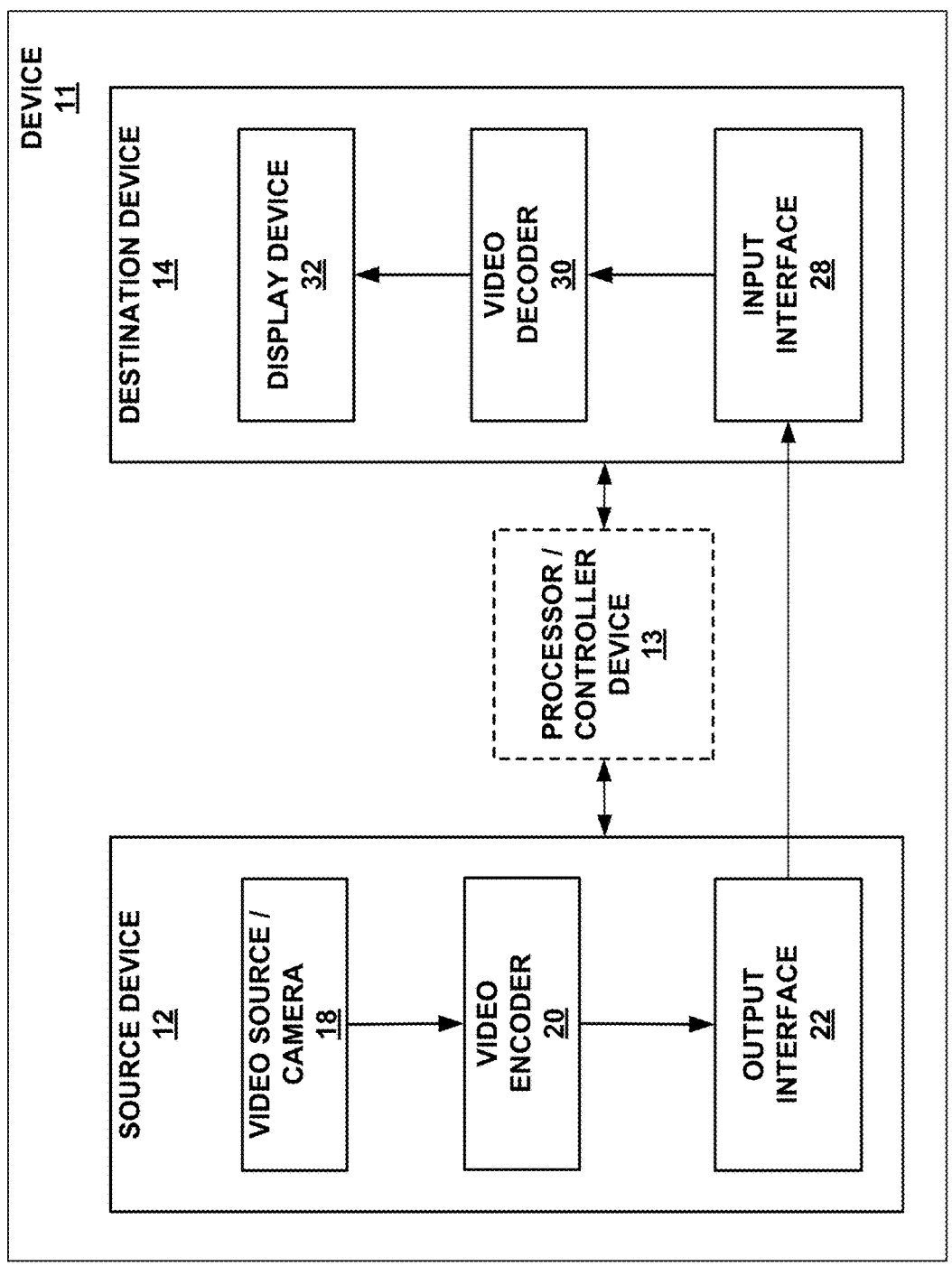
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a quantization parameter (QP). To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
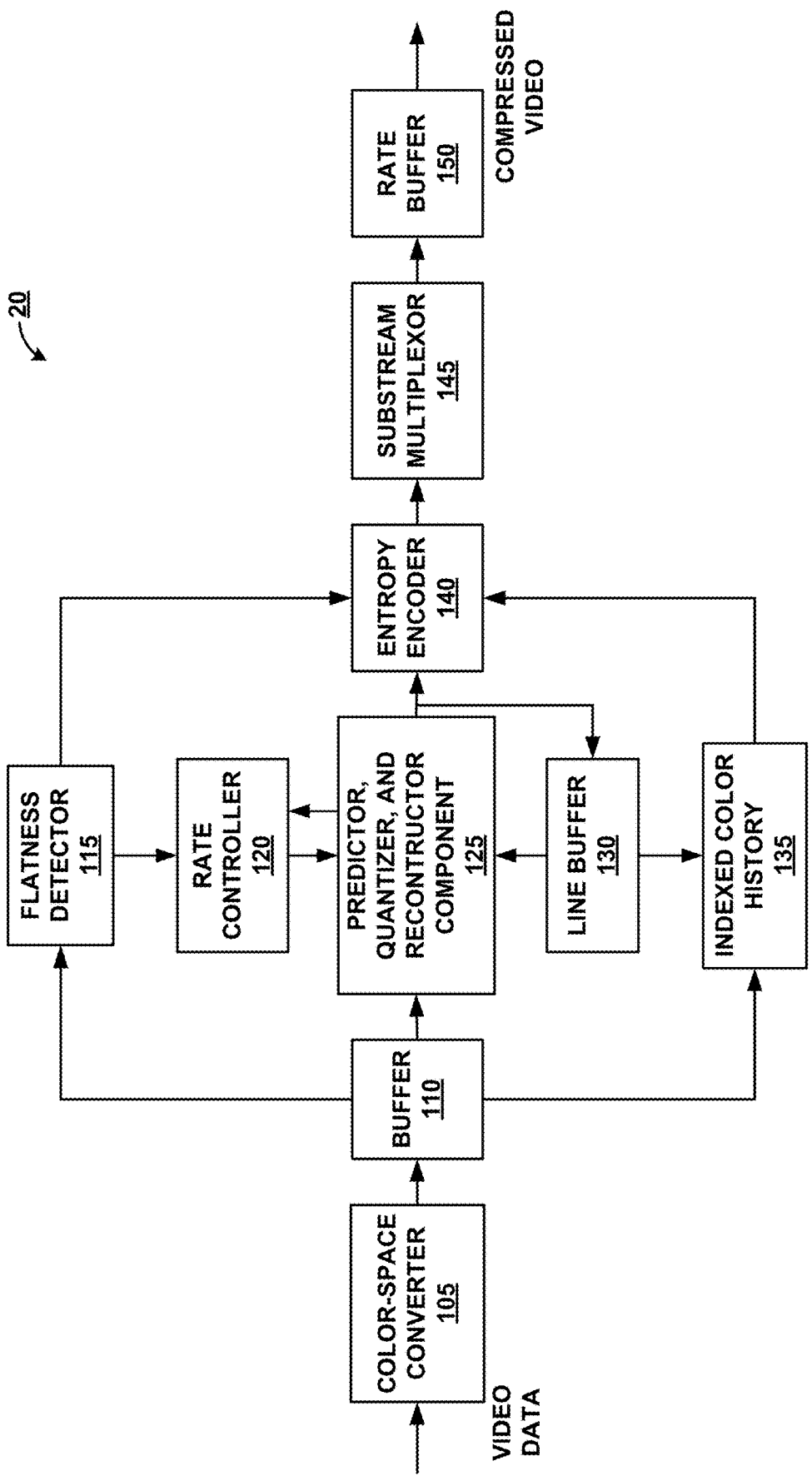
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space 105 converter may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a constant bit rate (CBR) buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

$$BF=((BufferCurrentSize*100)/BufferMaxSize)$$

The flatness detector 115 can detect changes from complex (i.e., non-flat) areas in the video data to flat (i.e., simple or uniform) areas in the video data. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. For example, a region of the video data may be determined to be a complex region when the number of bits required to encode the region are greater than a threshold. The term flat as used herein generally describes a region of the video data as being simple for the video encoder 20 to encode and may, for example, include a smooth gradient in the video data, low spatial frequency, and/or other features which are simple to encode. For example, a region of the video data may be determined to be a flat region when the number of bits required to encode the region are less than the threshold.

However, depending on the implementation, the determination of whether a given region is complex or flat may also be determined based on the encoding standard used, the specific hardware included in the video encoder 20, the type of video data to be encoded, etc. Further, certain properties of the video data regions may influence how many bits are required to encode the region, for example, high texture and/or high spatial frequency regions may require more bits to be encoded than lower texture and/or lower spatial frequency regions. Similarly, regions comprising random noise may be require a large number of bits to be encoded compared to more structured regions of the video data. Thus, in certain implementations, regions of the video data may be identified as complex and/or flat regions by comparing a measure of the texture and/or spatial frequency of the region (e.g., a complexity value) to a complexity threshold. The transitions between complex and flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified. In some embodiments, a plurality of different complexity levels (e.g., "very flat", "flat", "slightly flat", "slightly complex", "complex", "very complex") may be defined, each associated with a different threshold value. For example, if a region has a complexity value below a first threshold, the region may be considered to be "very flat." On the other hand, the region may be considered to be "flat" if the complexity value of the region is between the first threshold and a second threshold higher than the first threshold. In some embodiments, complexity values may be determined for a block of video data as an indication of a texture and/or spatial frequency of the pixel values of the block.

The rate controller 120 determines a set of coding parameters, e.g., a QP. The QP may be adjusted by the rate controller 120 based on the buffer fullness of the rate buffer 150 and image activity of the video data in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample. As further discussed below with reference to FIGS. 3-6, the predictor, quantizer, and reconstructor component 125 may be configured to predict (e.g., encode or decode) the block of video data (or any other unit of prediction) by performing the methods illustrated or described in connection with in FIGS. 3-6.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
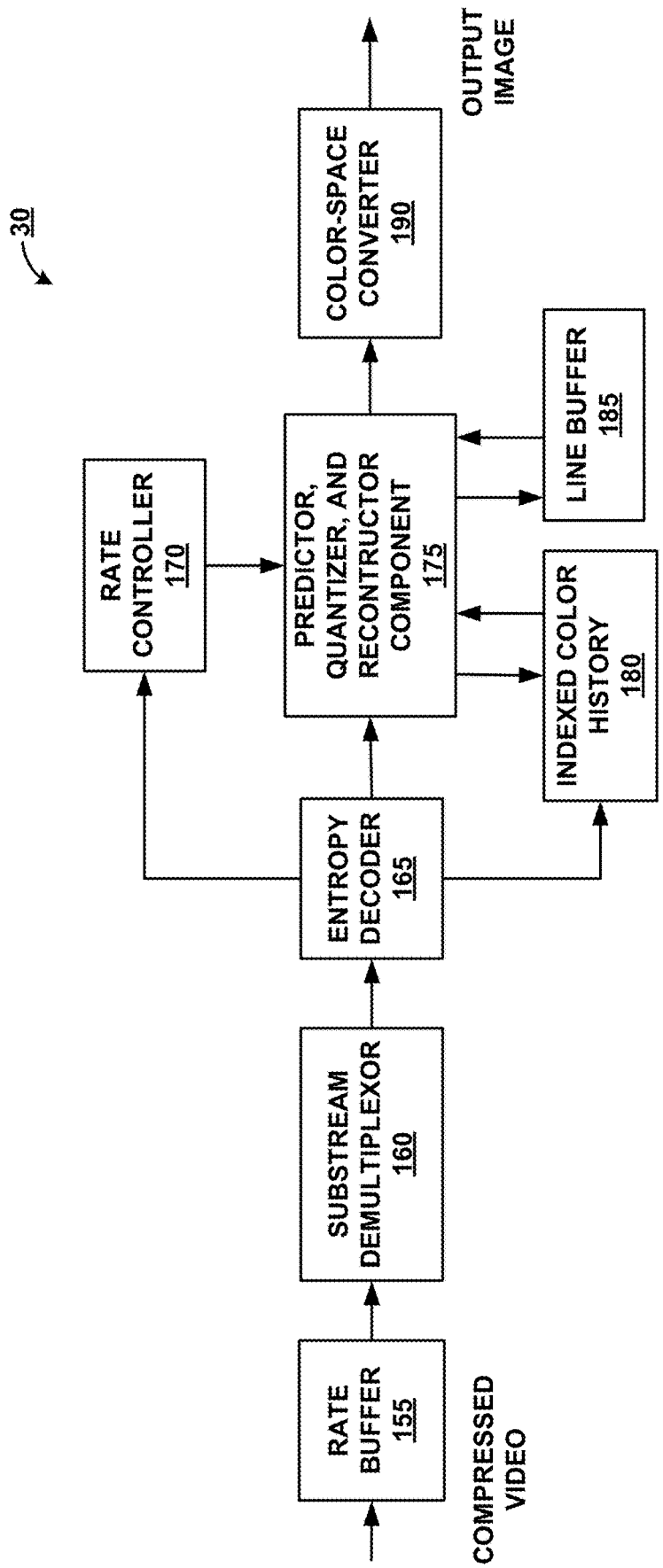
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Quantization Parameter (QP)

As described above, video coding may include the quantization of the video data via, for example, the predictor, quantizer, and reconstructor component 125. Quantization may introduce loss into a signal and the amount of loss can be controlled by the QP determined by the rate controller 120. Rather than storing the quantization step size for each QP, a scaling matrix may be specified as a function of the QP. The quantization step size for each QP may be derived from the scaling matrix, and the derived value may not necessarily be a power of two, i.e., the derived value can also be a non-power of two.

Slices in DSC

As noted above, a slice generally refers to a spatially distinct region in an image or a frame that can be decoded independently without using the information from the rest of the regions in the image or frame. Each image or video frame may be encoded in a single slice or each image or video frame may be encoded in several slices. In DSC, the target bits allocated to encode each slice may be substantially constant. This may differ for partial slices, which can occur if the image height is not divisible by the slice height. For example, an image of size 1280×720 with slice height of 108 will have 6 slices of height 108 and one partial slice of height 72 (=720−(6*108)).

Advanced DSC slice dimensions can be specified using variables or parameters slice Width×slice Height, where slice Width and slice Height are configurable. Slice Height can be configured to a desired value, for example, 16, 32, 108, etc. Slice Width can be configured using a parameter N, which determines the number of slices in a line, and it is assumed that the number of pixels per line in each slices is equal, e.g., slice Width=image Width/N. Image Width can be a variable or parameter representing the width of an image.

Processing to Reduce Slice Boundary Visual Artifacts

Figure 3A:
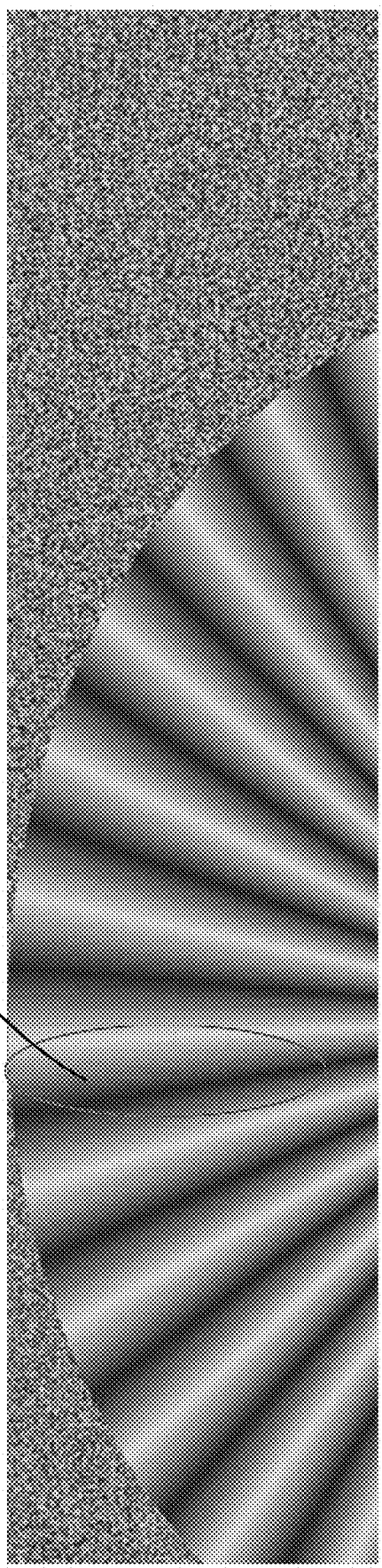
FIGS. 3A and 3B illustrate a visual artifact(s) across a slice boundary(ies) in accordance with aspects described in this disclosure.
Figure 3B:
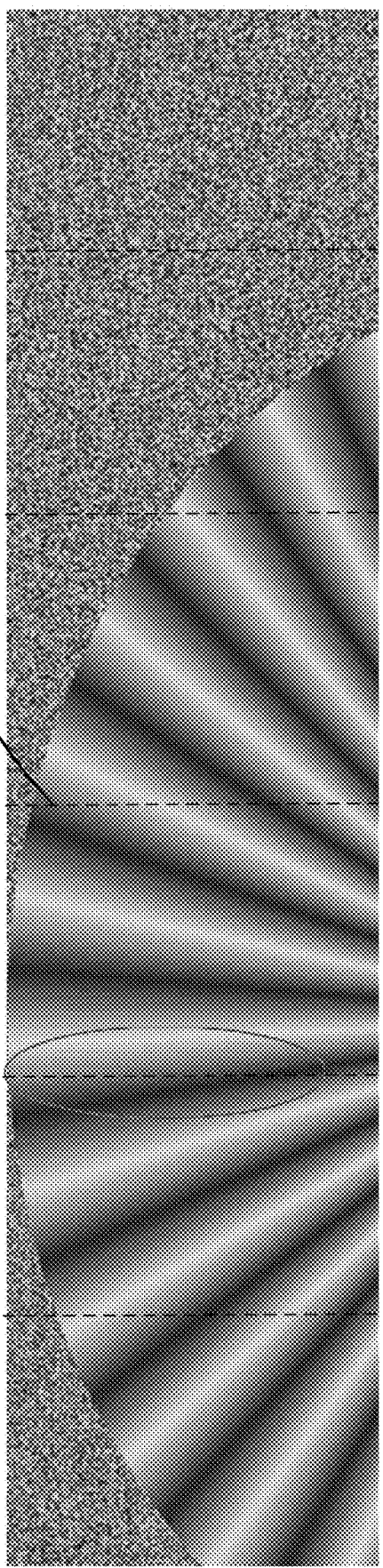

Advanced DSC can be configured to use multiple slices in a line. For example, the parameter N is greater than 1 (i.e., N>1). However, when the Advanced DSC is configured to use multiple slices in a line, noticeable visual artifacts can appear at the vertical slice boundaries. For example, FIGS. 3A and 3B illustrates a visual artifact(s) that may occur across a slice boundary(ies). In FIG. 3A, the artifact 302 is marked by an oval (which does not belong to the original or reconstructed image). The artifact 302 occurs near one or a plurality of slice boundaries 304, as illustrated in FIG. 3B. In some embodiments, the artifact 302 may appear as a chromatic discontinuity. For example, the image illustrated in FIGS. 3A and 3B show a gradient of different shades of green near the location of the artifact 302. The artifact 302 may comprise a discontinuity in the gradient.

In order to address these and other challenges, the techniques of the present disclosure can address the visual artifact across the slice boundary when Advanced DSC is configured to use multiple slices in a line. For example, the QP value can be adjusted based on whether a transition from a complex/busy region to a flat/smooth region exists between one or more blocks or within a block. The techniques can check for various types of transitions. For example, the techniques may determine whether a transition exists between the last block in the previous line and the first block in the current line within the same slice, or within the last block in each line in the current slice, or between the current block and spatially neighboring blocks in the same slice or the next slice in the same line, etc. Complexity values may be determined for one or more blocks in order to determine whether such a transition exists. The QP value of the current block or other blocks can be adjusted based on the determination that a transition exists. For example, the QP value can be decreased when a transition exists. Detecting transitions and adjusting the QP value can reduce the appearance of visual artifacts across slice boundaries. Details relating to certain aspects are provided below, for example, in connection with FIGS. 3-6.

In related aspects, disclosed herein is a DSC coder that provides low cost, fixed rate visually lossless compression. The coder is designed based on a block-based approach (e.g., with block size P×Q) and may be implemented with one or more of a multitude of coding modes. For example, available coding options for each block include transform mode (e.g., DCT, Hadamard), block prediction mode, differential pulse-code modulation (DPCM) mode, pattern mode, mid-point prediction (MPP) mode, and/or mid-point predication fall back (MPPF) mode. Several coding modes may be used in the coder to compress different types of content or images. For example, images containing rendered text may utilize the pattern mode heavily while natural images may rely more on the transform mode.

In further related aspects, a coding mode may be selected and utilized for each block from among a plurality of candidate coding modes based on a rate-control technique for selecting the optimal mode(s) for each block by considering both the rate and the distortion of the candidate mode. The rate-control technique may involve utilizing a buffer model, and a design consideration of the codec may include making sure that the buffer is not in a state of underflow (e.g., fewer than zero bits in the buffer) or overflow (e.g., buffer size has increased past a set/defined maximum size).

Various examples are provided below for addressing visual artifacts across slice boundaries. Some examples can address visual artifacts at the left side of a slice, visual artifacts at the right side of a slice, etc. Certain examples may consider information within the slice (e.g., information relating to blocks themselves, spatially neighboring blocks, etc.), and other examples may consider information outside the slice (e.g., information relating to a spatially neighboring slice). In some cases, examples can consider information relating to one or more previous blocks (e.g., the QP, bits spent on coding, etc.).

For instance, Example 1 below can address visual artifacts at the left side of a slice, and Examples 2-6 can address visual artifacts on the right side of a slice. Examples 1-2 and 4-6 may consider information available within the slice, and Example 3 may also consider information available from outside the slice (e.g., next slice). Examples 5-6 can consider the QP and/or bits used for coding previous one or two blocks (e.g., last one or two blocks in the previous line).

In some embodiments, an indicator of whether the QP value is set to a lower value or not is signaled. For example, a value of 1 can indicate that the QP value should be lowered, and a value of 0 can indicate that the QP value should not be lowered. In such cases, the QP value can be derived at the encoder and the decoder, e.g., based on predetermined values. In other embodiments, the QP value itself can be signaled.

Example 1

In one example, to correct or fix the visual artifact across a slice boundary, the QP value of the first block in each line is decreased or dropped if a transition exists from a complex/busy region at the last block in the previous line (within the same slice) to a flat/smooth region at the first block in the current line (within the same slice). According to certain aspects, it is important to note that both the last and first blocks are within the same slice. For example, in flat/smooth regions, the colors or shading of the video data may be more uniform. As such, any deviations and noise caused by loss through quantization may result in visible artifacts. On the other hand, in complex/busy regions of an image, small losses and deviations may not be visible. Therefore, in general it may be necessary to have a lower QP value for regions that are flat/smooth, while regions that are complex/busy may have higher QP values.

In some embodiments, the QP value for a block may be set based upon a complexity of the block, the QP values of the previous and/or next block, and/or a number of bits used to code the previous and/or next block. For example, if the number of bits used to code the previous block was higher than an expected number of bits based upon the QP value of the previous block, then the QP value of the current block may be raised to reduce a number of bits that would be needed to code the current block. On the other hand, if the number of bits used to code the previous block was lower than the expected number of bits, then the QP value of the current block may be lowered.

However, for blocks that are the first block or last block of the slice on a line, the previous and/or next block may not be available since they are part of a different slice. Where a block is located at a slice boundary transitions (e.g., the first or last block of the slice on a particular line), it is important to maintain a uniform QP value across the transition in order to prevent visual artifacts. When the boundary blocks of the slice and their neighboring blocks are uniformly flat/smooth or complex/busy, the QP value of the boundary block may be set to a suitably low or high value. However, where a transition between complex/busy and smooth flat occurs near the boundary block, then the QP of the block may not be set as low as it should be using normal QP value setting methods. Instead, special cases may be recognized to set the QP value of the boundary block to a predetermined low value in order to avoid the appearance of visual artifacts in the video data.

Figure 4:
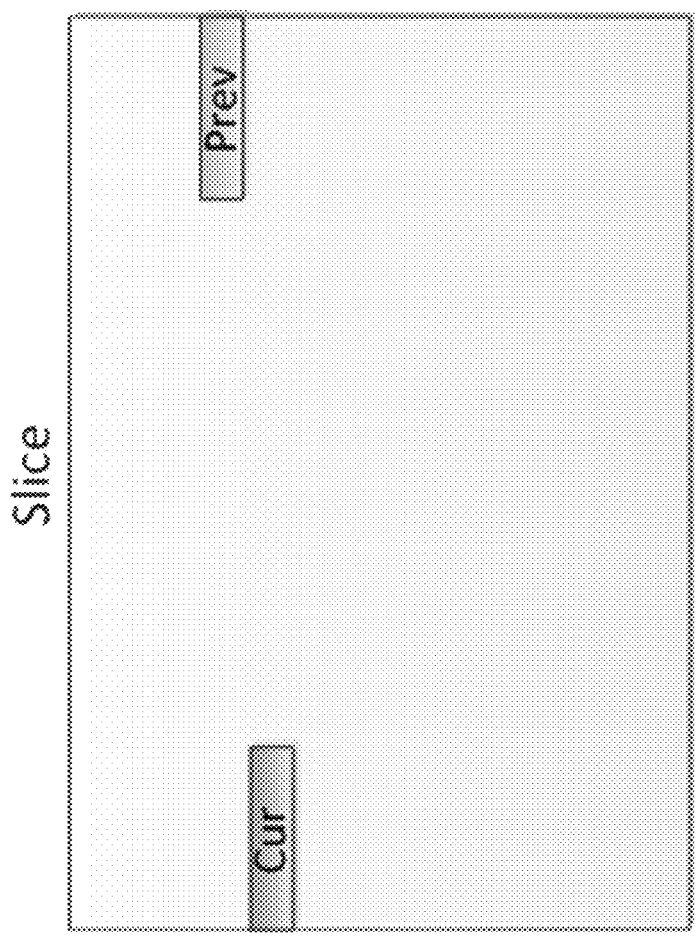
FIG. 4 illustrates a first block in the current line and a last block in the previous line within a slice, in accordance with aspects described in this disclosure.

FIG. 4 shows a previous block and a current block in a slice. The previous block is the last block in the previous line, and the current block is the first block in the current line. The QP value of the first block (Cur) in each line is set to a low value when there is a visual transition from a complex region at the last block in the previous line (Prev) to a flat region in the first block (Cur). In some embodiments, this may be done because the previous block spatially in the video data (e.g., the last block on the current line from the previous slice) is unavailable (e.g., due to each slice being encoded independently without any information from other slices in the video data).

In order to analyze or determine the visual transition, a complexity value of the last block in the previous line and the first block in the current line may be calculated. As discussed above, a complexity value of a block may be representative of a texture and/or spatial frequency of pixel values within the block. In one implementation, the complexity value can be calculated as described in U.S. patent application Ser. No. 14/685,479, filed Apr. 13, 2015, which is incorporated herein by reference in its entirety. The complexity values of both blocks can be compared to determine whether a transition has occurred or not. If a transition is detected, the QP value of the first block is set to a pre-determined lower value by the codec; otherwise, the QP value is not set to a pre-determined lower value.

The pseudocode to identify the transition is described in Table 1, where the Boolean variable isComplexToFlat stores the end result (e.g., whether a transition occurred or not), and $T_1$ and $T_2$ are predetermined threshold parameters. Variables curBlockComp and prevBlockComp are complexity values of the current block and the previous block.

TABLE 1

Pseudocode for Example 1

```
// to detect the transition
if(curBlkPosX = 0) //first block in each line
{
    Bool isComplexToFlat = false;
    if(curBlockComp < T₁)
    {
        isComplexToFlat = (prevBlockComp > T₂ )
    }
}
```

In the above implementation, instead of strict inequalities, non-strict inequalities may be used, e.g., "<" can be replaced by "<=" and ">" can be replaced by ">=".

In some embodiments, the QP value of the first block in the line may be set based only on the complexity of the Cur block, and not the Prev block. In some embodiments, different threshold values corresponding to different QP values may be used. For example, if the complexity of a block is lower than a first threshold corresponding to "very flat", the block may be adjusted to a first QP value. On the other hand, if the block has a complexity value higher than the first threshold but lower than a second threshold corresponding to "somewhat flat", the block may be adjust to a second, different QP value that is higher than the first QP value.

Example 2

Figure 5:
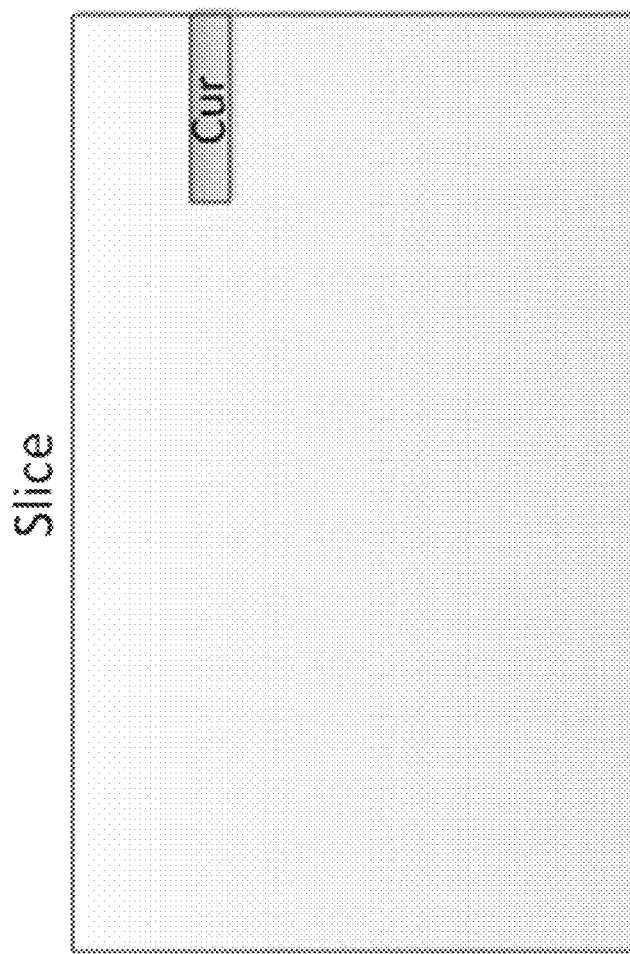
FIG. 5 illustrates a last block in the current line within a slice, in accordance with aspects described in this disclosure.

In order to correct or fix the slice boundary artifact, e.g., at the last block in each line in the slice or at image boundary, the QP of the last block in each line is decreased when certain conditions are met. In one implementation, the condition might be checking if the last block contains a transition from complex to flat regions. FIG. 5 shows a current block, which is the last block in a line in a slice. The QP value of the last block (Cur) in each line is set to a low value when the complexity value of the Cur block is less than a certain pre-determined threshold. In another implementation, both the previous (e.g., second-to-last block in the line) and last blocks may be used to identify the transition.

The complexity value of the last block in each line might be used to detect this transition. For example, if the complexity value of the last block in each line is less than a certain threshold, then it can be concluded that there may be a transition. Further, if the transition is detected, the QP value of the last block in each line can be set to a predetermined lower value by the codec; otherwise QP value is not set to the predetermined value. The complexity value can be calculated as described in U.S. patent application Ser. No. 14/685,479, filed Apr. 13, 2015, e.g., based on transform coefficients. As the complexity value of the block may be calculated in the transform domain, transitions in the block may be detected based upon the calculated complexity value.

The pseudocode is described in Table 2, where the Boolean variable isLastBlockFlat (e.g., whether a transition occurred or not within the block) stores the end result, and $T_3$ is the predetermined threshold parameter. Variable curBlockComp is the complexity value of the current block.

TABLE 2

Pseudocode for Example 2

```
// to detect if the last block complexity in each line of the slice is low or
not
if(isLastBlockInLine) //last block in each line of the slice
{
    Bool isLastBlockFlat = false;
    isLastBlockFlat = (curBlockComp < T₃)
}
```

In the above implementation, instead of strict inequalities, non-strict inequalities may be used.

Example 3

Figure 6:
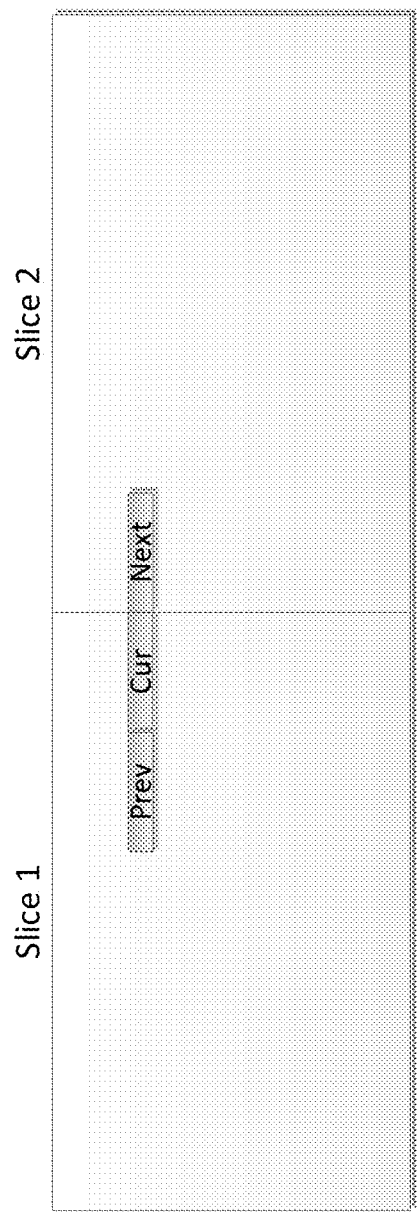
FIG. 6 illustrates a last block in the current line in a slice, a previous block in the same line in the same slice, and a first block in the same line in the next slice, in accordance with aspects described in this disclosure.

In some embodiments, each slice is coded independently, without any knowledge of other slices within the frame. However, in other embodiments, information from other slices may be available when coding a current slice. In such cases, instead of checking only complexity of the last block in each line of the slice, the complexity value of the first block in the same line in the spatially neighboring slice may also be used to identify the transition from a complex region to a flat region. FIG. 6 shows a last block (Cur) in the current slice and a first block (Next) in the next slice. The first block (Next) in Slice 2 can be used along with the last block (Cur) in Slice 1. The QP value of the last block (Cur) in each line is set to a low value when there is a transition between complex/busy and flat region. The "Next" block refers to the first block in the same line as the "Cur" block in the spatially neighboring slice. The decision to decrease the QP of the "Cur" block can be made based on "Cur" and "Next" block complexity values. According to certain aspects, it is important to note that only the encoder needs to access the "Next" block in the neighboring slice. For instance, the decoder does not need it, and in general will not have the original sample values in the "Next" block, since the decision (e.g., whether the QP value has been set to a lower value or not) is explicitly signaled to the decoder. The QP value of the "Cur" block can be set to a lower value which is a predetermined value by the codec, when there is a transition from a complex region to a flat region. The transition can be identified based on the complexity values of the "Next" and "Cur" block values, using the methods as described in U.S. patent application Ser. No. 14/685,479, filed Apr. 13, 2015. In cases where the "Next" block in the spatially neighboring slice is not available, e.g., at image boundaries, the decision of whether to adjust the QP can be made based only on the "Cur" block as described previously.

Example 4

In some embodiments, in addition to "Cur" and "Next" blocks, "Prev" block information may also be used to decide if the QP value of the last block ("Cur") should be set to a predetermined lower value by the codec, if transition from complex to flat region is detected. FIG. 6 also shows a block (Prev) that is previous to the last block (Cur) in the current slice. The "Prev" block may refer to the spatially neighboring block in the same line before the last block ("Cur") in each line in the current slice. The decision to decrease the QP of the "Cur" block can be made based on "Prev", "Cur" and "Next" block complexity values. The transition from complex to flat region can be determined based on the complexity values of Prev, Cur, and Next blocks as methods described in U.S. patent application Ser. No. 14/685,479, filed Apr. 13, 2015.

Example 5

In certain embodiments, if the QP value of the last block in a given line is set to a lower value, then the QP value of the first block in the next line in the same slice may be calculated based on the QP value of the "Prev" block and bits spent on coding the "Prev" block, instead of using the QP value and the bits spent on coding the "Cur" block. The "Prev" and "Cur" blocks may be as shown in FIG. 6. This may be done in order to save bits and also to avoid buffer overflow, when the first few blocks in the current line and the last few blocks in the previous line are complex, or when the entire slice is complex, except the last block in each line of the slice. As such, it may be unnecessary for the first block of the next line have a low QP value based upon the last block on the current line. Instead, by basing the QP value of the first block of the next line on the "Prev" block (second-to-last block on the current line), the QP value of the block may be setting to a more appropriate value.

Example 6

In some embodiments, the QP value of the first block in the next line in the same slice may be calculated based on both "Cur" and "Prev" blocks, e.g., if the QP value of the last block in a given line is set to a lower value. For instance, the QP value may be based on average QP values of "Prev" and "Cur" blocks and average bits spent on coding the "Prev" and "Cur" blocks. In other embodiments, the QP value may be calculated based on the QP value of the "Prev" block and bits spent on coding the "Cur" block. According to certain aspects, other information such as buffer fullness, bits remaining in slice, flatness information, etc. may also be used while or in calculating the QP, e.g., in addition to using the bits spent and QP information of the previously coded blocks.

All examples and embodiments described in this disclosure may be implemented separately or in combination, depending on the embodiment. Certain features of the examples and the embodiments may be omitted or changed, and other features may be added to the examples and the embodiments, depending on the embodiment.

Process Flow

Figure 7:
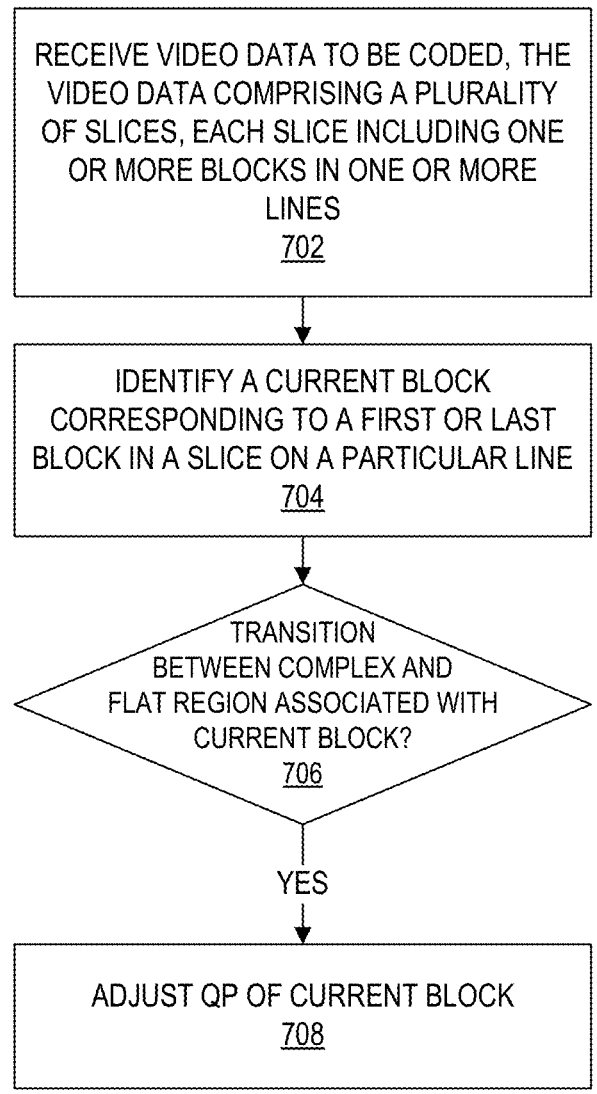
FIG. 7 illustrates a flowchart of an example process for adjusting quantization parameters when encoding video data, in accordance with some embodiments.

FIG. 7 illustrates a flowchart of an example process for adjusting quantization parameters when encoding video data, in accordance with some embodiments. At block 702, the encoder receives video data to be coded. The video data comprises a plurality of slices, which slice including one or more blocks arranged in one or more lines. Each line includes blocks from multiple slices. For example, each line may span a plurality of slices, each of the plurality of slices comprising one or more blocks along each line. At block 704, a current block to be decoded is identified, the current block corresponding to a first or last block of a slice on a particular line. For example, as illustrated in FIG. 4, the current block may correspond to the first block on a particular line in its slice. On the other hand, as illustrated in FIG. 5, the current block may correspond to the last block of a slice on a particular line.

At block 706, a determination is made as whether a transition between a complex and a flat region is associated with the current block and/or one or more neighboring blocks of the current block. In some embodiments, the determination may comprise determining whether a transition occurs within the current block. For example, a transition may be detected as occurring within the current block if the current block has a complexity value less than a threshold value (e.g., is flat). In some embodiments, a transition may be detected within the current block only if the current block corresponds to the last block of a slice on a particular line.

In some embodiments, where the current block is the first block of the slice on a line, a determination may be made as to whether there is a transition between the current block and a neighboring block corresponding to a last block of the slice on the previous line (e.g., previous block). The determination that a transition has occurred may comprise determining that a complexity of the current block is less than a first threshold value (e.g., is flat) and that a complexity of the neighboring block is greater than a second threshold value (e.g., is complex).

In some embodiments, the determination may comprise determining whether there is a transition between the current block and a neighboring block corresponding to the previous block of the same slice on the same line (e.g., previous block). For example, a transition may be determined to have occurred if the current block has a complexity value less than a first threshold, and the previous block has a complexity value greater than a second threshold.

In some embodiments where information from other slices is available when encoding a current slice, and the current block is the last block of the slice on the line, the determination may comprise determining whether there is a transition between the current block and a neighboring block corresponding to the first block of a subsequent slice on the same line (e.g., next block). In some embodiments, the determination may comprise determining a transition between any of the current block, previous block, and next block.

If it is determined that a transition associated with the current block exists, then at block 708, the QP of the current block may be adjusted (e.g., lowered). For example, the QP of the block may be set to a predetermined value. On the other hand, if no transition is determined to have occurred, the QP of the current block may be determined normally (e.g., based upon the complexity, QP value, and/or number of bits used to code a previous block).

Figure 8:
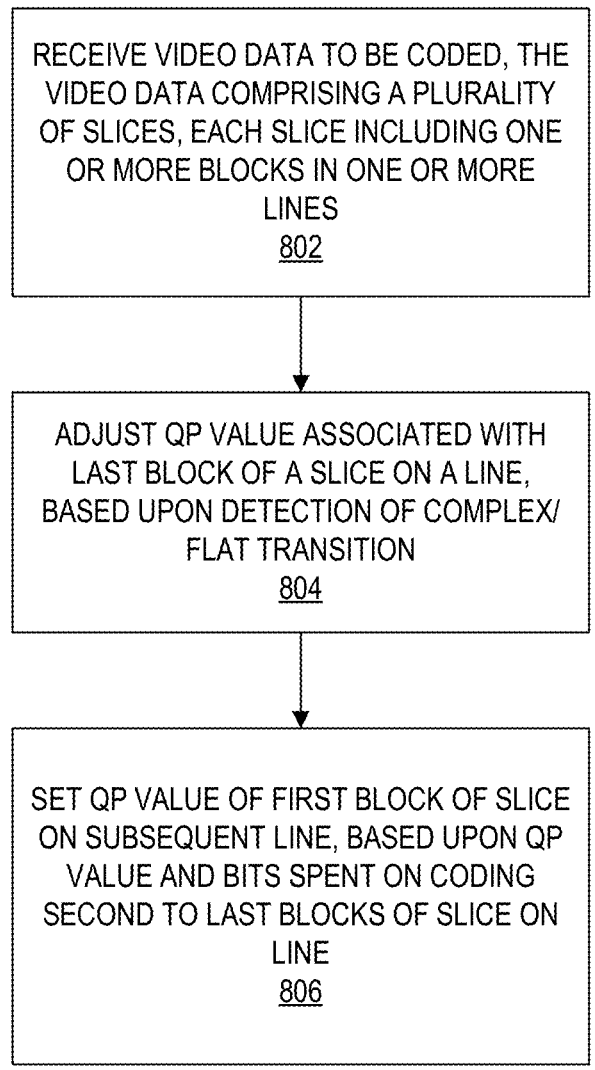
FIG. 8 illustrates a flowchart for another example process for adjusting quantization parameters when encoding video data, in accordance with some embodiments.

FIG. 8 illustrates a flowchart for another example process for adjusting quantization parameters when encoding video data, in accordance with some embodiments. At block 802, the encoder receives video data to be coded. The video data may comprise a plurality of slices, each slice including one or more blocks arranged in one or more lines.

At block 804, the QP value of a last block of a slice on a particular line may be adjusted. In some embodiments, the QP value of the last block may be adjusted based upon a detected transition (e.g., a transition between a complex region and a flat region) associated with the last block of the slice on the line. In some embodiments, the transition may be determined within the last block of the slice on the line, based upon the last block of the slice on the line and the previous block on the same line, upon the last block and a next block on the line in a subsequent slice, and/or some combination thereof.

At block 806, the encoder sets the QP value of the first block of the slice on a subsequent line, based upon the QP value of the second-to-last block of the slice on the line (e.g., previous block) and/or the number of bits used to code the second-to-last block. Because the QP value of the last block of the slice on the line was lowered to a predetermined value due to the detection of a transition, basing the QP value of the first block of the subsequent line on the last block may result in a QP value that is lower than needed, potentially causing more bits to be used when coding the block. Therefore, the QP value of the first block on the subsequent line may be based upon that of the second-to-last block on the line instead of the last block. In some embodiments, the number of bits used to code the second-to-last block may also be considered. For example, if the number of bits used to code the second-to-last block was higher than expected (e.g., based upon the QP value and complexity of the second-to-last block), the QP value determined for the first block of the subsequent line may be higher, and vice versa.

In some embodiments, the QP value of the first block may be based upon both the last block and the second-to-last block of the slice on the line. For example, the QP value may be based upon an average QP value and/or an average number of bits used to code the last and second-to-last blocks. In some embodiments, the QP value of the first block may be based upon the QP value of the second-to-last block and the number of bits used to code the last block.

Figure 9:
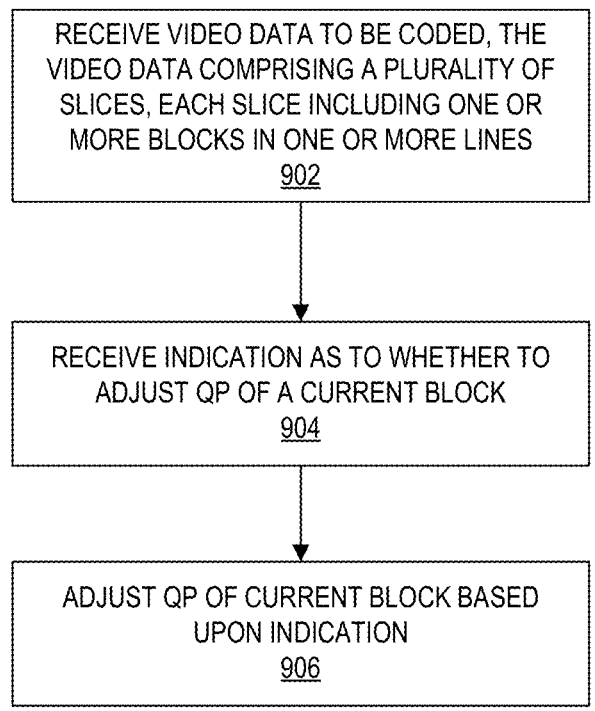
FIG. 9 illustrates a flowchart of an example process for decoding video data, in accordance with some embodiments.

FIG. 9 illustrates a flowchart of an example process for decoding video data, in accordance with some embodiments. At block 902, the decoder receives a bitstream corresponding to video data to be decoded. The video data may correspond to a plurality of slices, each slice including a plurality of blocks arranged on one or more lines.

At block 904, the decoder receives an indication of whether of adjust the QP of a current block of a slice of video data. In some embodiments, the current block may correspond to a last block of the slice on a particular line, or the first block of the slice on a particular line. At block 906, the decoder adjusts the QP of the current block based upon the received indication.

Other Considerations

It should be noted that aspects of this disclosure have been described from the perspective of an encoder, such as the video encoder 20 in FIG. 2A. However, those skilled in the art will appreciate that the reverse operations to those described above may be applied to decode the generated bitstream by, for example, the video decoder 30 in FIG. 2B.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. An apparatus for encoding video data, comprising:
  a memory for storing the video data; and
  a hardware processor comprising an integrated circuit, the hardware processor being operationally coupled to the memory, the hardware processor comprising:
    a buffer configured to receive a slice of video data to be coded corresponding to a spatially distinct region in a frame of the video data, the slice including one or more blocks organized in one or more lines, and wherein the slice can be coded independently without information from any other slices of video data;
    a flatness detector configured to determine a complexity value of a current block corresponding to a last block of the slice on a particular line, wherein the complexity value is a measure of one or more of a texture or spatial frequency of the current block, and wherein the flatness detector is further configured to determine whether the current block is associated with a first transition from a complex region to a flat region based at least in part upon the determined complexity value of the current block and a complexity value of a next block in a next slice, wherein complex regions are characterized as having higher complexity in comparison to flat regions;
    a rate controller configured to determine a quantization parameter (QP) for the current block based on one or more of the complexity value of the current block, a QP value of a previous block, or a number of bits used to code the previous block, wherein in response to a determination that the current block is associated with the first transition, the rate controller is further configured to decrease the determined QP for coding the current block;
    a predictor component configured to encode the current block using a prediction mode, recently used pixel values in an indexed color history, and the decreased QP; and
    a rate buffer configured to output the encoded current block at a constant bit rate.

2. The apparatus of claim 1, wherein the rate controller is further configured to decrease the determined QP to a predetermined value in response to the determination that the current block is associated with the first transition.

3. The apparatus of claim 1, wherein the flatness detector is further configured to compare the determined complexity value of the current block to a threshold value to determine whether the current block is associated with the first transition.

4. The apparatus of claim 1, wherein the flatness detector is further configured to:
  determine a complexity value of the next block;
  determine whether the complexity value of the next block is less than a first threshold;
  in response to a determination that the complexity value of the next block is less than the first threshold, determine whether the complexity value of the current block is greater than a second threshold, the second threshold being smaller than the first threshold; and
  determine that the second transition exists between the current block and the next block in response to the determination that the complexity value of the current block is greater than the second threshold.

5. A computer-implemented method for encoding video data, comprising:
  receiving, by a buffer, a slice of video data to be coded corresponding to a spatially distinct region in a frame of the video data, the slice including one or more blocks organized in one or more lines, and wherein the slice can be coded independently without information from any other slices of video data;
  determining, by a flatness detector, a complexity value of a current block corresponding to a last block of the slice on a particular line, wherein the complexity value is a measure of one or more of a texture or spatial frequency of the current block;
  determining, by the flatness detector, whether the current block is associated with a first transition from a complex region to a flat region based at least in part upon the determined complexity value of the current block and a complexity value of a next block in a next slice, wherein complex regions are characterized as having higher complexity in comparison to flat regions;
  determining, by a rate controller, a quantization parameter (QP) for the current block based on one or more of the complexity value of the current block, a QP value of a previous block, or a number of bits used to code the previous block, and, in response to a determination that the current block is associated with the first transition, decreasing, by the rate controller, the determined QP for coding the current block;
  encoding, by a predictor component, the current block using a prediction mode, recently used pixel values in an indexed color history, and the decreased QP; and
  outputting, by a rate buffer, the encoded current block at a constant bit rate.

6. The computer-implemented method of claim 5, further comprising decreasing, by the rate controller, the determined QP to a predetermined value in response to the determination that the current block is associated with the first transition.

7. The computer-implemented method of claim 5, further comprising comparing, by the flatness detector, the determined complexity value of the current block to a threshold value to determine whether the current block is associated with the first transition.

8. The computer-implemented method of claim 5, further comprising:
- determining, by the flatness detector, a complexity value of the next block;
- determining, by the flatness detector, whether the complexity value of the next block is less than a first threshold;
- in response to a determination that the complexity value of the next block is less than the first threshold, determining, by the flatness detector, whether the complexity value of the current block is greater than a second threshold, the second threshold being smaller than the first threshold; and
- determining, by the flatness detector, that the second transition exists between the current block and the next block in response to the determination that the complexity value of the current block is greater than the second threshold.

* * * * *